United States Patent
St-Laurent

(10) Patent No.: US 10,702,753 B2
(45) Date of Patent: Jul. 7, 2020

(54) STRENGTHENING BALL BATS AND OTHER COMPOSITE STRUCTURES WITH NANO-ADDITIVES

(71) Applicant: EASTON DIAMOND SPORTS, LLC, Thousand Oaks, CA (US)

(72) Inventor: Frederic St-Laurent, Oak Park, CA (US)

(73) Assignee: EASTON DIAMOND SPORTS, LLC, Thousand Oaks, CA (US)

( * ) Notice: Subject to any disclaimer, the term of this patent is extended or adjusted under 35 U.S.C. 154(b) by 0 days.

(21) Appl. No.: 16/184,885

(22) Filed: Nov. 8, 2018

(65) Prior Publication Data

US 2020/0147462 A1 May 14, 2020

(51) Int. Cl.
*A63B 59/54* (2015.01)
*B32B 1/08* (2006.01)
*B32B 27/08* (2006.01)
*B32B 27/20* (2006.01)

(52) U.S. Cl.
CPC ............... *A63B 59/54* (2015.10); *B32B 1/08* (2013.01); *B32B 27/08* (2013.01); *B32B 27/20* (2013.01); *B32B 2264/10* (2013.01)

(58) Field of Classification Search
CPC ........ A63B 59/50–58; A63B 2059/581; A63B 2102/18; A63B 2102/182; A63B 2069/0008
USPC .......................... 473/457, 519, 520, 564–568
See application file for complete search history.

(56) References Cited

U.S. PATENT DOCUMENTS

| | | | |
|---|---|---|---|
| 6,790,425 B1 | 9/2004 | Smalley et al. | |
| 7,344,691 B2 | 3/2008 | Chen et al. | |
| 9,504,891 B1 * | 11/2016 | Chen | A63B 59/54 |
| 2004/0209716 A1 * | 10/2004 | Vacek | A63B 59/54 473/567 |
| 2006/0025249 A1 * | 2/2006 | Giannetti | A63B 59/51 473/564 |
| 2006/0135281 A1 * | 6/2006 | Palumbo | A01K 87/00 473/316 |
| 2006/0135282 A1 * | 6/2006 | Palumbo | A01K 87/00 473/316 |
| 2006/0287126 A1 * | 12/2006 | Aisenbrey | A01K 87/00 473/316 |
| 2007/0155546 A1 * | 7/2007 | Chauvin | A63B 59/00 473/520 |
| 2008/0234076 A1 * | 9/2008 | Bhatt | A63B 59/51 473/566 |

(Continued)

OTHER PUBLICATIONS

U.S. Appl. No. 62/734,532, filed Sep. 21, 2018, Chambert et al.

(Continued)

*Primary Examiner* — Jeffrey S Vanderveen
(74) *Attorney, Agent, or Firm* — Perkins Coie LLP

(57) ABSTRACT

A nano-enhanced matrix material includes a matrix film carrying one or more nano-additives. The nano-additives may be oriented transversely relative to the matrix film. A composite structure includes a plurality of composite laminate plies and one or more matrix films carrying one or more nano-additive materials, the matrix films being positioned between composite laminate plies. Composite structures may include ball bats, and the matrix films with nano-additive materials may be positioned in selected portions of ball bats, such as wherever improved strength or resistance to fatigue is desired.

19 Claims, 6 Drawing Sheets

(56) References Cited

U.S. PATENT DOCUMENTS

2015/0290510 A1* 10/2015 Davis .................... A63B 60/42
473/564

OTHER PUBLICATIONS

ASTM International, "F2398-11: Standard Test Method for Measuring Moment of Inertia and Center of Percussion of a Baseball or Softball Bat" USA Baseball ABI Protocol, edition approved Apr. 1, 2011, published May 2011, 3 pages.

ASTM International, "F2844-11: Standard Test Method for Displacement Compression of Softball and Baseball Bat Barrels" USA Baseball ABI Protocol, edition approved Apr. 1, 2011, published May 2011, 3 pages.

Composites World, "CNT-enhanced prepregs: commercial & production-capable," available at https://www.compositesworld.com/articles/cnt-enhanced-prepregs-commercial-production-capable, Article Post: Sep. 30, 2015.

Composites World, Toho Tenax hybrid prepreg combines carbon fiber, CNT, available at https://www.compositesworld.com/products/toho-tenax-launches-hybrid-prepreg-that-combines-carbon-fiber-and-cnt-technology, Product Post: Feb. 16, 2018.

Lakshmi, et al, "Investigation of interlaminar shear strength in carbon epoxy and carbon epoxy carbon nanotubes using experimental and finite element technique," International Journal of Engineering Research and Applications (IJERA), vol. 2, Issue 3, May-Jun. 2012, pp. 001-010, available at http://www.ijera.com/papers/Vol2_issue3/A23001010.pdf.

Nanowerk, "CNT-based Prepreg Materials are Now Available for a Wider Range of Composite Applications through Nanocyl," available at https://www.nanowerk.com/news/newsid=12624.php, Posted: Sep. 15, 2009.

Zyvex Technologies, "Aroply RFI: Resin Film Infusion," exact publication date unknown, archived website dated Jun. 24, 2017 available at https://web.archive.org/web/20170624200122/http:/www.zyvextech.com/aroply/, visited on Feb. 12, 2019.

* cited by examiner

STRENGTHENING BALL BATS AND OTHER COMPOSITE STRUCTURES WITH NANO-ADDITIVES

BACKGROUND

Composite structures, such as ball bats for baseball or softball, may be made with one or more plies of composite laminate material, which typically include a fiber-reinforced matrix material. In a typical composite structure formed with multiple plies of composite laminate material, the proportion of matrix material (sometimes in the form of resin) relative to the proportion of fiber material is higher between the plies (in the interlaminar interfaces) than in the laminate plies themselves. These areas, and other areas in which the matrix material makes up much or all of the assembly relative to traditional reinforcing materials, are typically referred to as "resin-rich" areas. Resin-rich areas tend to be weaker than areas reinforced with more fibers. Designers of composite structures consider these areas when determining the overall strength of the structure. For example, designers often analyze the interlaminar shear strength of an assembled ball bat.

During repeated use of composite structures such as ball bats, the matrix or resin of the composite material tends to crack, and the fibers tend to stretch or break. Sometimes the composite material develops interlaminar failures, which involve plies of the composite materials separating or delaminating from each other along a failure plane between the plies in the interlaminar interface. For example, the plies may separate along the resin rich areas.

In ball bats, this "break-in" reduces stiffness and increases the elasticity or trampoline effect of a bat against a ball, which tends to temporarily increase bat performance. As a bat breaks in, and before it fully fails (for example, before the bat wall experiences a through-thickness failure), it may exceed performance limitations specified by a governing body, such as limitations related to batted ball speed. Some such limitations are specifically aimed at regulating the performance of a bat that has been broken in from normal use, such as BBCOR ("Bat-Ball Coefficient of Restitution") limitations.

Some unscrupulous baseball or softball players choose to intentionally break in composite bats to increase performance. Intentional break-in processes may be referred to as accelerated break-in (ABI) and may include techniques such as "rolling" a bat or otherwise compressing it, or generating hard hits to the bat with an object other than a ball. Such processes tend to be more abusive than break-in during normal use, and they exploit the relatively weak interlaminar shear strength of resin-rich areas found in the composite structures of typical ball bats to try to increase batted ball speed. Some sports governing bodies require that composite bats meet certain standards even after an ABI procedure in order to limit the increase in performance from use and abuse of a composite bat (this may be referred to as "ABI testing").

Nanomaterials, which are generally understood to include materials whose individual portions are very small, such as on the order of 1 to 1000 nanometers or other small sizes, are recognized as having unique chemical and structural properties that enhance the properties of ordinary materials. Composite materials may benefit from nanotechnology. For example, some composite material suppliers include nano-additives in the matrix material of a pre-impregnated ("pre-preg") composite laminate material. Some manufacturers or suppliers may provide nano-additives to the matrix in a resin transfer molding (RTM) process. But existing methods of including nano-additives are inefficient in terms of cost and wasted materials.

Discontinuities in composite plies or the fibers within composite plies, such as ends of composite plies or fibers, create weaknesses in overall composite structures, especially where the ends abut each other or are otherwise joined together. Accordingly, composite plies are generally used in long continuous sections to avoid weaknesses in high-stress zones of the composite structure. In turn, the matrix material must be distributed throughout the entire length of a composite ply. But nano-additives can be expensive or in limited supply. So including nano-additives in all of the matrix material increases production costs or otherwise complicates production. For example, when composite plies are cut or trimmed, nano-additives may be wasted, or unnecessary joints or weaknesses may be created in the assembly. There is a need for efficient enhancement of composite structures using nano-additives.

SUMMARY

Systems and methods for strengthening ball bats and other composite structures with nano-additives include a nano-enhanced matrix material including a matrix film carrying one or more nano-additives. The matrix film may be carried by a release material, for transportation, storage, handling, or application. In some embodiments, a composite structure includes a plurality of composite laminate plies and a matrix film carrying one or more nano-additive materials, the matrix material being positioned between at least two composite laminate plies.

In some embodiments, the composite structure may be a sporting-good implement, such as a ball bat with a handle and a barrel. The barrel may include a plurality of composite laminate plies forming a wall of the barrel, and one or more nano-additive materials (optionally, carried by a matrix film) positioned between the composite laminate plies, such as in a resin-rich area between the plies. In some embodiments, some of the nano-additive materials may be oriented transversely relative one or more of the composite laminate plies. In some embodiments, the matrix material with nano-additive materials may be positioned between a first composite laminate ply having fibers oriented along a first direction, and a second composite laminate ply having fibers oriented along a second direction, with the first direction oriented at an angle of at least 10 degrees relative to the second direction. In some embodiments, the nano-additive materials may be positioned at an area of high performance, such as a center of percussion of the ball bat. Nano-additive materials may include carbon nanotubes, silica nanoparticles, graphenes, or mica nanoparticles, or other nanomaterials.

In some embodiments, a method of making a composite structure, such as a ball bat, includes positioning a first ply of composite laminate material on a mold, positioning a matrix film on the first ply of composite laminate material, wherein the matrix film carries one or more nano-additive materials, positioning a second ply of composite laminate material on the matrix film and on the first ply of composite laminate material, and curing the stack of the first ply of composite laminate material, the matrix film, and the second ply of composite laminate material, to form the composite structure.

The matrix film, with nano-additives, may be positioned in a composite structure by pressing the film onto a ply of composite laminate material or a fiber mat and, optionally, removing a release material from the matrix film.

Other features and advantages will appear hereinafter. The features described above can be used separately or together, or in various combinations of one or more of them.

BRIEF DESCRIPTION OF THE DRAWINGS

In the drawings, wherein the same reference number indicates the same element throughout the views.

DETAILED DESCRIPTION

Figure 1:
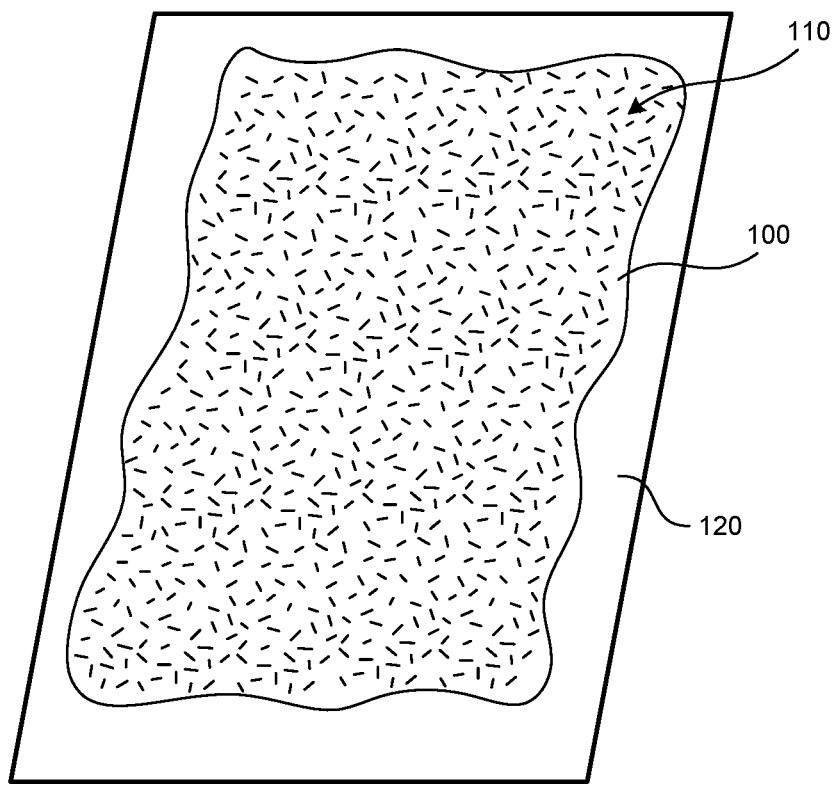
FIG. 1 illustrates a perspective view of a matrix film carrying one or more nano-additives, the matrix film itself carried by a release material, in accordance with embodiments of the present technology.

The present technology is directed to systems and methods for strengthening composite structures, such as ball bats, with nano-additives. Various embodiments of the technology will now be described. The following description provides specific details for a thorough understanding and enabling description of these embodiments. One skilled in the art will understand, however, that the technology may be practiced without many of these details. Additionally, some well-known structures or functions, such as structures or functions common to composite laminate materials, composite manufacturing processes, composite structures, or ball bats, may not be shown or described in detail to avoid unnecessarily obscuring the relevant description of the various embodiments. Accordingly, embodiments of the present technology may include additional elements or exclude some of the elements described below with reference to FIGS. 1-6, which illustrate examples of the technology.

The terminology used in the description presented below is intended to be interpreted in its broadest reasonable manner, even though it is being used in conjunction with a detailed description of certain specific embodiments of the invention. Certain terms may even be emphasized below; however, any terminology intended to be interpreted in any restricted manner will be overtly and specifically defined as such in this detailed description section.

Where the context permits, singular or plural terms may also include the plural or singular term, respectively. Moreover, unless the word "or" is expressly limited to mean only a single item exclusive from the other items in a list of two or more items, then the use of "or" in such a list is to be interpreted as including (a) any single item in the list, (b) all of the items in the list, or (c) any combination of items in the list.

Specific details of several embodiments of the present technology are described herein with reference to ball bats. Embodiments of the present technology may be used in other sporting-good implements, such as hockey sticks, lacrosse sticks, cricket bats, or other sporting-good implements. Embodiments of the present technology may be used in other composite structures and in other industries, such as transportation, construction, or anywhere composite materials can benefit from improved properties. Nano-additive materials (which may simply be referred to as nano-additives) described herein can improve strength (such as interlaminar shear strength) and resistance to fatigue (such as resistance to losing stiffness despite use or abuse).

One way to implement nano-additives sparingly includes replacing a selected section of a composite pre-preg laminate ply (which includes a matrix material and a fiber material) with a pre-preg laminate ply carrying nano-additives, such that only a selected portion of the composite ply includes nano-additives. But such an approach would disturb the continuity of the overall pre-preg ply. Weaknesses would be introduced at the multiple interfaces between the pre-preg laminate ply with nano-additives and the pre-preg laminate ply without nano-additives. The present technology provides systems and methods to include nano-additives in a composite structure while maintaining continuity of the laminate ply (and thereby avoiding weak spots due to unnecessary butt joints between sections of the ply), and while using fewer nano-additives.

Turning now to the drawings, FIG. 1 illustrates a matrix film 100 carrying one or more nano-additives 110 (shown as a pattern of distributed elements), in accordance with embodiments of the present technology. The nano-additives 110 may be distributed evenly within the matrix film 100, may be layered on top of the matrix film 100, may be layered on the bottom of the matrix film 100, or may be unevenly distributed or otherwise distributed within the matrix film 100. In general, the nano-additives 110 are partially or fully embedded in the matrix film 100. In some embodiments, the one or more nano-additives 110 may include carbon nanotubes, silica nanoparticles, graphenes, mica nanoparticles, rubber particles, or any other suitable nano-additive or combination of nano-additives. In some embodiments, the additives need not be a nano-scaled material. For example, particles in the additives may have other suitable sizes.

In some embodiments, the matrix film 100 may include a resin material, an epoxy material, a polyurethane material, a polyester material, or another matrix material suitable for use in composite structures (such as composite matrix materials suitable for use with pre-preg materials or RTM processes). In some embodiments, the matrix film 100 may be carried by a release material 120, such as release paper or a release polymer (which may be a plastic material or another suitable polymer), to facilitate shipping or handling. For example, the release material 120 may include polyester (PE), polypropylene (PP), or other release materials or combinations of release materials. In some embodiments, the matrix film 100 (with nano-additives 110) may be sandwiched between the release material 120 and another release material, such as another release paper or release polymer, to further facilitate shipping or handling by covering both sides of the matrix film 100. In some embodiments, the matrix film 100 (with nano-additives 110) may not be carried by a release material or sandwiched between release materials. For example, in some embodiments, the matrix film 100 may be self-supporting. In some embodiments, the matrix film 100 may be between approximately 12 microns and 120 microns thick, such as between 12 and 25 microns thick.

In some embodiments, the nano-additives 110 may be applied to or included in the matrix film 100 by a process in which the matrix film 100 is given an electric charge or placed in an electric or magnetic field, the nano-additives are sprinkled onto the matrix film 100, and the nano-additives align with electric or magnetic fields from the charge. For example, in some embodiments, elongated nano-additives (those with a longer dimension along one axis than along other axes, such as carbon nanotubes) may be used. In some embodiments, some (such as most or all) of the elongated nano-additives may be aligned to stand along directions that are generally transverse to the matrix film 100, such as a perpendicular direction relative to the matrix film 100. In other embodiments, nano-additives may align in other orientations, such as a horizontal, diagonal, or random orientation (relative to a horizontal matrix film 100, for example). In some embodiments, the nano-additives may have consistent orientations. In other embodiments, some of the nano-additives may be inconsistently oriented relative to other nano-additives.

Figure 1A:
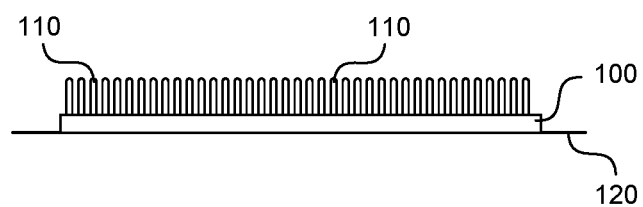
FIG. 1A illustrates a side view of a matrix film carrying one or more nano-additives, the matrix film itself carried by a release material, in accordance with embodiments of the present technology.

In a particular example, FIG. 1A illustrates a side view of a matrix film 100 carrying nano-additives 110 (the optional release material 120 is also shown) aligned with one another in a generally perpendicular orientation relative to the matrix film 100. Although the nano-additives 110 are illustrated in a perpendicular orientation to the matrix film 110, in some embodiments, the nano-additives may be oriented along other transverse directions relative to the matrix film 100 that are not perpendicular. In some embodiments, it is desirable to use the nano-additives 110 to link the fibers of adjacent composite laminate plies, as explained below. Accordingly, in some embodiments, the nano-additives 110 may be oriented transverse to the matrix film 100 and transverse to plies in a composite laminate stack in which the matrix film 100 is positioned. In other embodiments, the nano-additives 110 may have other orientations or may link plies in a composite laminate stack in other ways. In some embodiments, the nano-additives 110 may not link plies together, and they may merely reinforce the matrix material in a resin-rich area.

Figure 2:
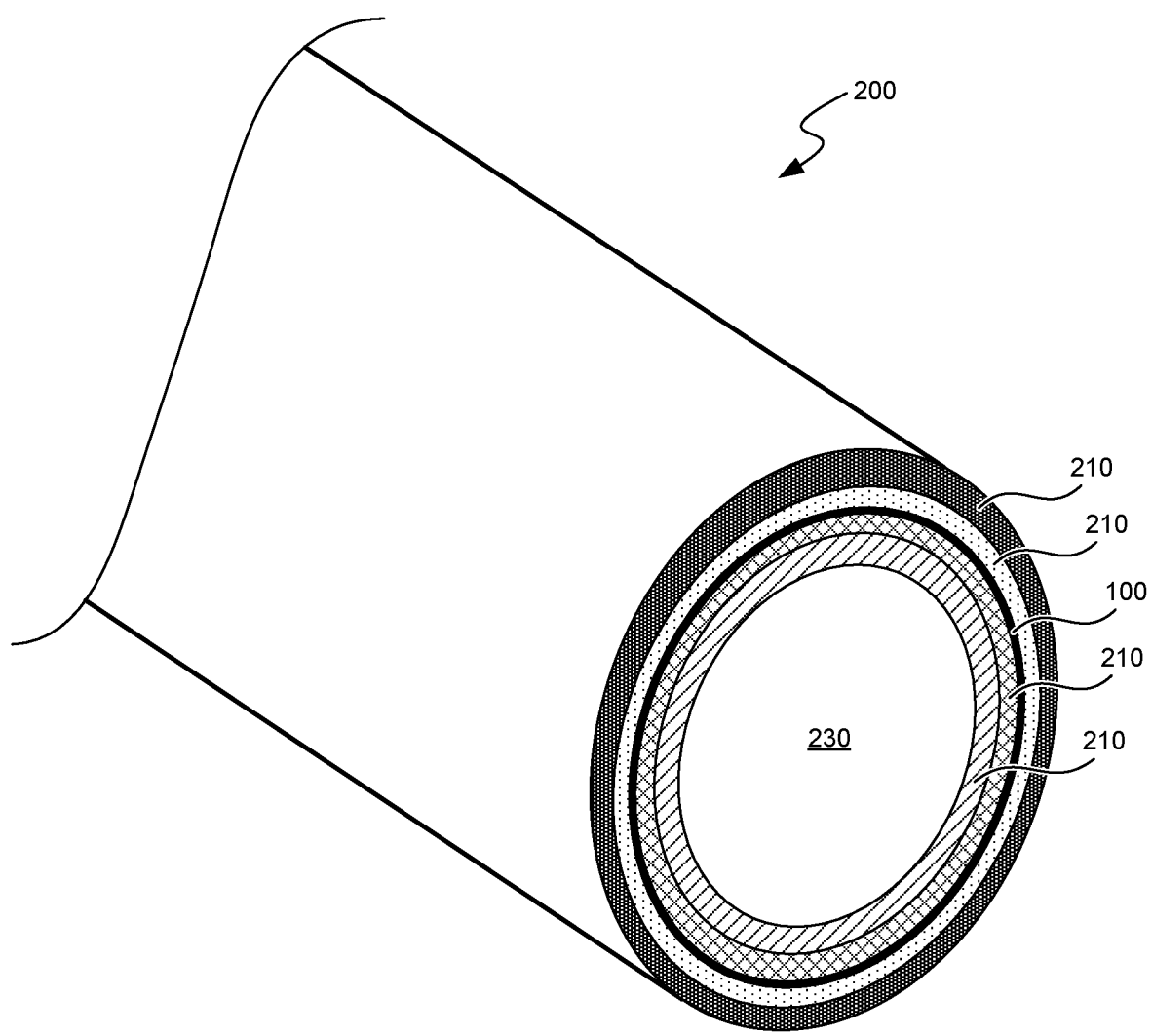
FIG. 2 illustrates an isometric and cross-sectional view of a composite structure in accordance with an embodiment of the present technology.

FIG. 2 illustrates an isometric, cross-sectional view of a composite structure 200 in accordance with an embodiment of the present technology. In some embodiments, the matrix film 100 with nano-additives 110 (see FIGS. 1 and 1A) may be included on or between plies 210 of composite laminate material (such as plies of fiber-reinforced matrix material). FIG. 2 shows the matrix film 100 positioned between two plies 210 of composite laminate material. However, in some embodiments, the matrix film 100 may be positioned on an inner or outer surface, or in other suitable positions within the stack of plies 210 of composite laminate material. Although one matrix film 100 is shown, embodiments of the present technology may include more than one matrix film 100 within a composite laminate structure (see FIG. 6 and the corresponding description of FIG. 6 below). In some embodiments, the composite structure 200 may form a wall of a ball bat (such as a wall of a bat barrel), and it may include a hollow interior 230. Although a circular cross-section is shown in FIG. 2 for the context of a ball bat, the structure 200 can have other cross-sections suitable for other composite structures.

Figure 3:
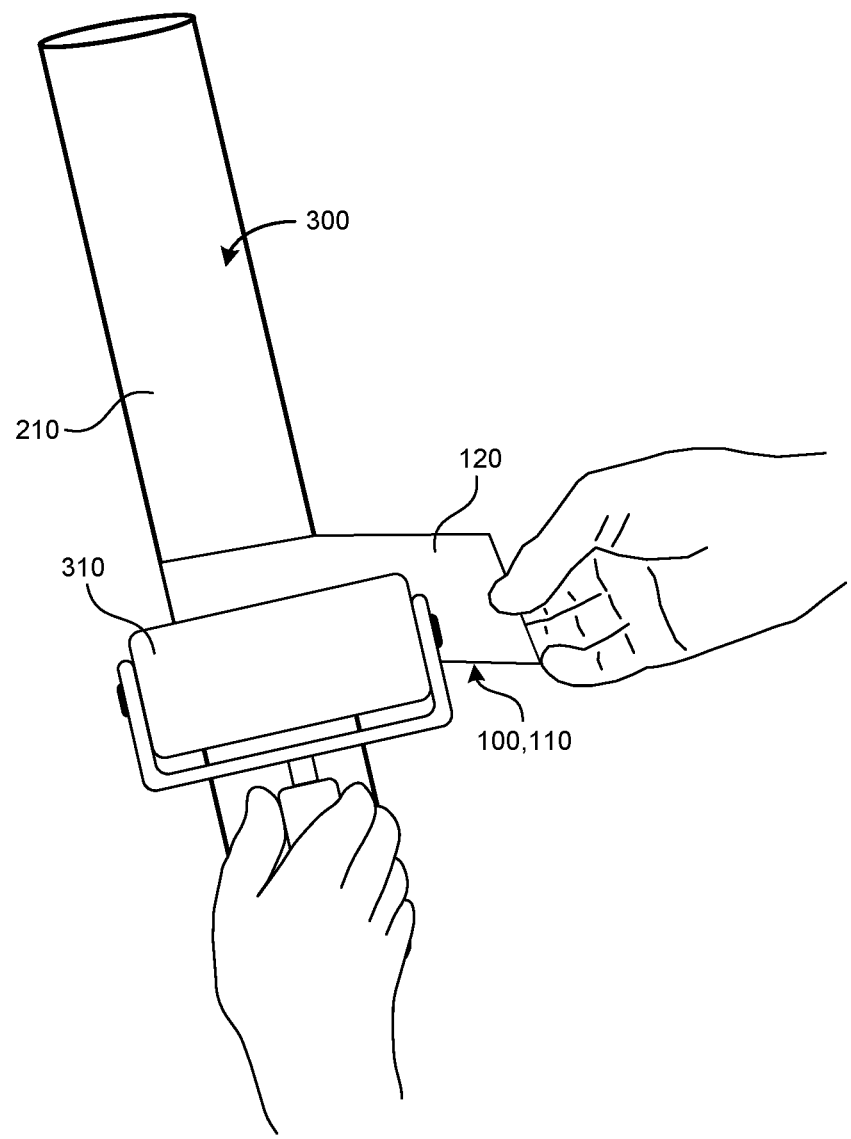
FIG. 3 illustrates adding nano-additives (carried by a matrix film) to a composite structure, in accordance with embodiments of the present technology.

FIG. 3 illustrates a technique for adding nano-additives 110 (carried by a matrix film 100) to a composite structure 300 in accordance with embodiments of the present technology. In some embodiments, the composite structure 300 may be a portion of the composite structure 200 shown in FIG. 2, such that FIG. 3 shows part of a manufacturing process for the composite structure 200 shown in FIG. 2. In some embodiments, the matrix film 100 with the nano-additives 110 may be positioned on a ply 210 of composite laminate material in a selected location. In some embodiments, the matrix film 100 may be positioned on the ply 210 or adhered to the ply 210 by laying the matrix film 100 on the ply 210 and pressing on the backside of the release material 120 (opposite the side of the release material 120 that carries the matrix film 100) to press the matrix film 100 (and the nano-additives 110) onto the composite laminate ply 210 of the composite structure 300. For example, a roller 310 may be rolled over the back side of the release material 120. The roller 310 may be operated by hand as shown, or by a robot, or by any suitable operator. Although a roller 310 may be used to press the matrix film 100 against the ply 210, other suitable sources of pressure may be used or, in some embodiments, no pressure may be used.

Figure 4:
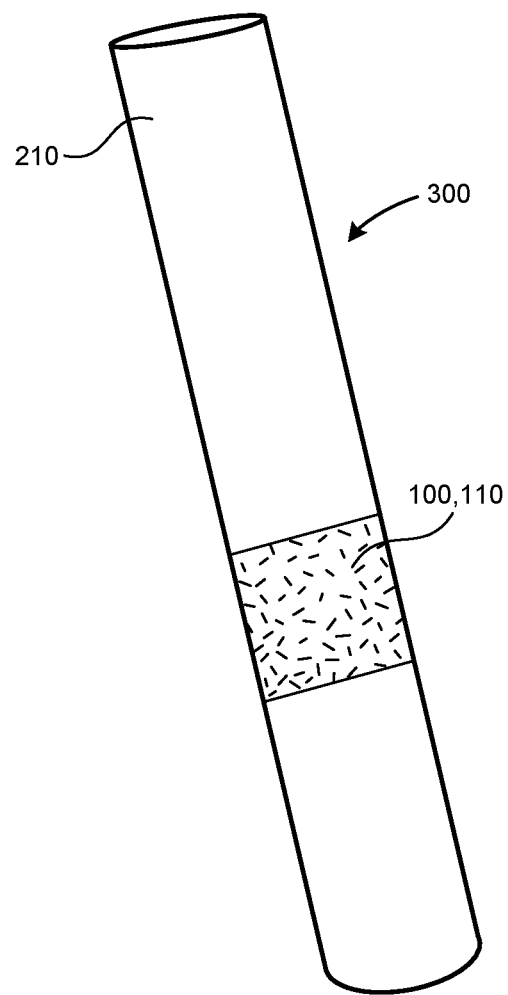
FIG. 4 illustrates a section of matrix film (carrying nano-additives) positioned on a composite structure in accordance with embodiments of the present technology.

In some embodiments, the release material 120 can be pulled (for example, peeled) away from the matrix film 100 (and away from the nano-additives 110) after the matrix film 100 is adhered to or otherwise positioned on the composite structure 300, leaving the matrix film 100 and nano-additives 110 on the composite laminate ply 210 of the structure 300. As noted above, in some embodiments, the matrix film 100 need not be carried or otherwise covered by a release material 120. Instead, in some embodiments, the matrix film 100 may be directly applied to the ply 210 of the composite structure 300, such as by wrapping the matrix film 100 around the structure or pressing it onto the ply 210 without the aid of a release material 120. FIG. 4 illustrates a section of matrix film 100 (carrying the nano-additives 110) applied to the ply 210. Although FIG. 4 shows the nano-additives in random diagonal arrangements, they may be oriented in other ways relative to the one or more composite laminate plies 210. For example, as described above, the nano-additives may be oriented along directions that are transverse to one or more plies 210, such as perpendicular to the plies 210. As noted above, the matrix film 100 with nano-additives 110 may be applied to pre-preg material or to fiber mats (for an RTM process, for example).

In some embodiments, one or more additional pre-preg plies may optionally be positioned over the matrix film 100 (see FIG. 2). Accordingly, in some embodiments, the matrix film 100 (with nano-additives 110) may be included in a stack of one or more pre-preg composite laminate plies to form a composite structure or a wall of a hollow composite structure (such as a ball bat), and then the entire assembly may be cured. The matrix film 100 may be positioned in between pre-preg composite plies, on top of the stack, or beneath the stack.

In some embodiments, the matrix film 100 (with nano-additives 100) may be added to a stack of fibrous mat plies (in between the fibrous mat plies, on top of the stack, or beneath the stack), and the assembly may receive another matrix material in a resin transfer molding (RTM) process before being cured. The matrix film 100 functions as a matrix or resin similarly to other matrix materials or resins in the composite stack, but it adds the nano-additives to the composite structure to alter the properties of the structure relative to composite structures that lack nano-additives.

Embodiments of the present technology provide enhanced structural properties relative to composite structures that do not have nano-additives, and embodiments of the present technology are more cost- and material-efficient than existing composite structures having nano-additives. For example, the nano-additives may improve strength, resilience, or other characteristics. Nano-additives 110 positioned in a composite structure according to embodiments of the present technology may increase interlaminar shear strength and resist or prevent cracking or delamination through resin-rich areas between composite laminate plies. In some embodiments, the nano-additives provide a composite-like material in the resin-rich area that helps bond adjacent composite laminate plies together.

Because the nano-additives 110 are carried by a matrix film 100, they can be applied to select localized portions of a composite layup instead of being included in the entirety of a matrix material. For example, the nano-additives do not need to be included in the entirety of a pre-preg material, which would be cut or trimmed during the layup process, resulting in waste. And the nano-additives do not need to be included in a matrix material received in a mold in an RTM process, which would also result in waste, and would result in unpredictable placement of the nano-additives. Instead, the matrix film 100 can be applied to specific locations where nano-additives are desired, resulting in less waste or no waste of the nano-additive material.

More specifically, when the nano-additives are applied to pre-preg material, they are generally applied to approximately 100 percent of the surface of the pre-preg material, which is undesirable when a user wants to use nano-additives in only part of the structure, such as 5 to 15 percent of the surface area of a composite layer (for example, areas where nano-additives optimize structural characteristics). Nano-additives generally cannot be applied only to specific portions of pre-preg material, and the composite layup process involves various angles and cutting patterns that are not optimal for using pre-preg material with nano-additives. The present technology avoids limitations associated with pre-preg material by enabling targeted and selective use of nano-additives.

Typical nano-additives, such as single-walled or multi-walled carbon nanotubes, nanofiber interleaving veils such as Nylon, and graphene, do not have strong anisotropic properties, which further reduces waste when they are carried by the matrix film 100, as opposed to being added to a pre-preg material.

Embodiments of the present technology also help avoid unnecessary joints or discontinuities in plies of a composite layup. For example, instead of cutting a strip of pre-preg material with nano-additives to fit between sections of pre-preg that do not have nano-additives, which would result in multiple discontinuities, the plies of the composite layup can remain continuous. The matrix film 100 (with nano-additives 110) may also be less costly to transport due to lighter unit weight, which is the result of the matrix film 100 not requiring fibers or a fiber mat (for example, because it either supports itself or is carried by a release material).

Figure 5:
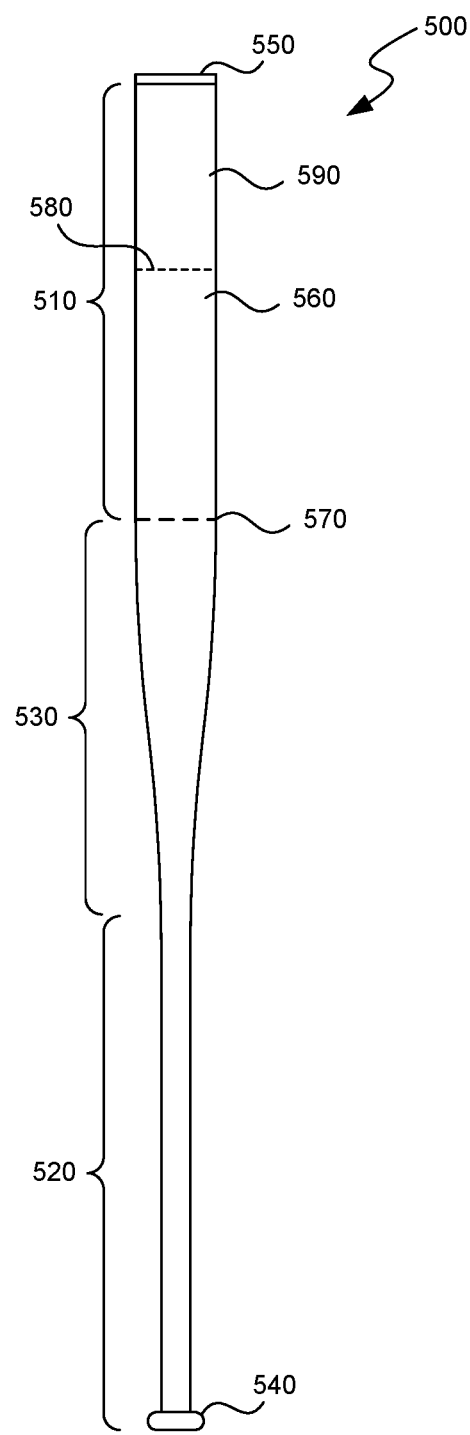
FIG. 5 illustrates a ball bat according to embodiments of the present technology.

FIG. 5 illustrates a ball bat 500 according to embodiments of the present technology. The ball bat 500 includes a barrel portion 510 connected to or integral with a handle portion 520. There may be a taper portion 530 between the barrel portion 510 and the handle portion 520, in which a larger diameter of the barrel portion 510 transitions to a narrower diameter of the handle portion 520. In some embodiments, the taper portion 530 may include part of the barrel portion 510, part of the handle portion 520, or parts of both the barrel portion 510 and the handle portion 520. The handle portion 520 may include an end knob 540 and the barrel portion 510 may optionally be closed with an end cap 550. The barrel portion 510 may include a non-tapered or straight section 560 extending between the end cap 550 and a location 570.

The bat 500 may have any suitable dimensions. For example, the bat 500 may have an overall length of 20 to 40 inches, or 26 to 34 inches. A diameter of the barrel portion 510 may be 2.0 to 3.0 inches, or 2.25 to 2.75 inches. Typical ball bats have diameters of 2.25, 2.625, or 2.75 inches. Bats having various combinations of these overall lengths and barrel diameters, or any other suitable dimensions, are contemplated herein. The specific preferred combination of bat dimensions is generally dictated by the user of the bat 500, and may vary greatly among users.

The barrel portion 510 may include one or more barrel walls 590 constructed with one or more composite materials. For example, with additional reference to FIG. 2, the barrel portion 510 may be, or may include, a composite structure 200 having a plurality of plies 210 of composite laminate material forming the barrel wall and surrounding a hollow interior 230 (although in some embodiments, the interior need not be hollow or it may include other structures). Some examples of suitable plies of composite laminate material include a matrix material (such as a resin) reinforced with fibers of carbon, glass, graphite, boron, aramid (such as Kevlar®), ceramic, or silica (such as Astroquartz®), or other materials suitable for forming composite structures. Accordingly, in various embodiments, a number of different composite laminate plies suitable for use in ball bats or other composite structures may be used, such that the barrel portion 510 may include carbon fiber, fiberglass, aramid fibers, or other composite materials or combinations of matrices, resins, fibers, laminates, and meshes forming composite materials. In some embodiments, the barrel portion 510 may include plies made of the same material (for example, each ply 210 may be formed from carbon fiber), while in other embodiments, the barrel portion 510 may include plies made of multiple different materials (for example, one or more plies 210 may be formed with carbon fiber and one or more plies 210 may be formed with fiberglass).

In some embodiments, the composite structure of the barrel portion 510 forming the barrel wall 590 may include between 16 and 50 composite laminate plies 210 (such as single-polarity plies or other plies). In some embodiments, depending on the type of structure or the type of ball bat, the composite structure may include any suitable number of composite laminate plies 210. For example, in a performance-oriented ball bat, there may be 20 to 25 composite laminate plies 210, while bats that must be compliant with BBCOR limitations may have 30 to 35 composite laminate plies. In other embodiments, structures may have more or fewer composite laminate plies 210 depending on the thickness of the plies, the materials used in each ply, and the desired structural qualities of the assembled bat 500 or other composite structure. In some embodiments, the plies 210 may include plies of pre-preg material that may be stacked around a bat-shaped mold, such as a mandrel. One or more matrix films 100 having nano-additives 110 may be positioned between plies 210, and the assembly may be cured into its final bat shape. In some embodiments, the plies 210 may be fiber mats cured together in an RTM process. Laying up composite laminate plies into a bat shape (sometimes known as a preform) and then curing the preform is known to those of ordinary skill in the art. However, according to embodiments of the present technology, one or more matrix films 100 having nano-additives 110 may be positioned between any two layers of composite laminate plies 210 or on an outside or inside ply.

The handle portion 520 may be constructed from the same material as, or different materials than, the barrel portion 510. In a two-piece ball bat, for example, the handle portion 520 may be constructed from a composite material (the same or a different material than that used to construct the barrel portion 510), a metal material, or any other material suitable for use in a striking implement such as the bat 500.

A center of percussion 580 is located in the barrel portion 510. The center of percussion 580 is a location along the length of the bat 500 where some of the highest or maximum batted ball speeds can be achieved. The center of percussion 580 is generally located at or near the "sweet spot" of the ball bat 500, and it may be measured or located according to the ASTM F2398-11 Standard. For example, in some bats, the center of percussion 580 may be located between 5.75 inches and 6.25 inches from the end of the bat having the end cap 550 (such as 6 inches from the end), depending on the characteristics of the bat assembly, including the optional cap 550. Note that although the center of percussion 580 is described and illustrated at a location in FIG. 5, the actual center of percussion 580 may reside at another location.

In some embodiments of the present technology, matrix film 100 may be positioned in portions of the ball bat 500 that experience more stress than other portions, for example, the portions that experience the most interlaminar shear stress. Some of these locations include the center of percussion, or locations where fatigue or strength is tested, or where other tests are performed. In some embodiments, the matrix film 100 may be positioned in other areas where the bat provides peak hitting performance, or where the bat is most prone to fracture.

The inventors observed that when an ABI test is performed on a barrel portion of a bat formed with a plurality of composite laminate plies, initial damage tends to occur to the inner 25 percent of the thickness of the barrel wall (the 25 percent of the thickness closest to the interior). Accordingly, in some embodiments, one or more matrix films 100 may be positioned between composite laminate plies in the inner 25 percent portion of the barrel wall. For example, if a barrel wall 590 includes 16 composite laminate plies 210 (see FIG. 2), the matrix film 100 (carrying the nano-additives 110) may be positioned between the four plies 210 closest to the interior 230. In some embodiments, matrix films 100 may have lengths between 2 and 6 inches along the long (longitudinal) axis of a bat, such as between 3 and 4 inches. As described above, the nano-additives 110 resist (such as prevent) delamination and other cracking in the ABI test to keep bats within performance regulations.

In some embodiments in which ball bats are tested for fatigue resistance, the nano-additives 110 may be provided where impacts with balls are most common, such as the hitting zone of the bat (which may include the straight section 560 of the ball bat 500, or other portions of the ball bat). In such embodiments, the nano-additives may be applied between the outermost plies 210 of a barrel wall, such as in the outer 25 percent to 40 percent of the wall thickness, or in other positions. Nano-additives may extend the useful life of a ball bat 500.

Some sports associations regulate barrel compression. In the art of ball bat design, designers may measure compression values by determining the amount of force required to compress a cylinder or ball bat in a radial direction. For example, designers may rely on compression values based on testing under the ASTM F2844-11 Standard Test Method for Displacement Compression of Softball and Baseball Bat Barrels. In some embodiments, the matrix film 100 with nano-additives 110 may be positioned near a location where barrel compression values are tested. In an exemplary embodiment, a circumferential wrap of matrix film 100 with nano-additives 110 may be positioned to extend approximately two to six inches along an axial length of the ball bat, and may be centered around the center of percussion or centered about a location approximately six inches from the distal end of the barrel portion 110 (opposite the end knob 540), which may correspond to the center of percussion. In some embodiments, the matrix film 100 with nano-additives 110 may be positioned between one inch and three inches on either side of the center of percussion or the location six inches from the distal end of the barrel portion 110. In some embodiments, for ball bats that may be tested with regard to compression values, the matrix film 100 with nano-additives 110 may be positioned in the outer 25 percent of the wall thickness, or in in another location within the plies of the barrel wall suitable for maintaining minimum compression strength through use, abuse, and testing. The nano-additives 110 resist or prevent delamination to diminish reductions in barrel compression through use or abuse, thereby increasing the useful life of the ball bat and helping to comply with barrel compression rules. For example, in prior art softball bats, such as prior art slow-pitch softball bats, delamination may begin in the outer 25 percent of a bat wall. Matrix films 100 in accordance with embodiments of the present technology improve integrity of the structure and may be implemented to improve the outer 25 percent of the wall thickness of a softball bat. Matrix films 100 in accordance with embodiments of the present technology may be implemented in multi-wall bats.

Figure 6:
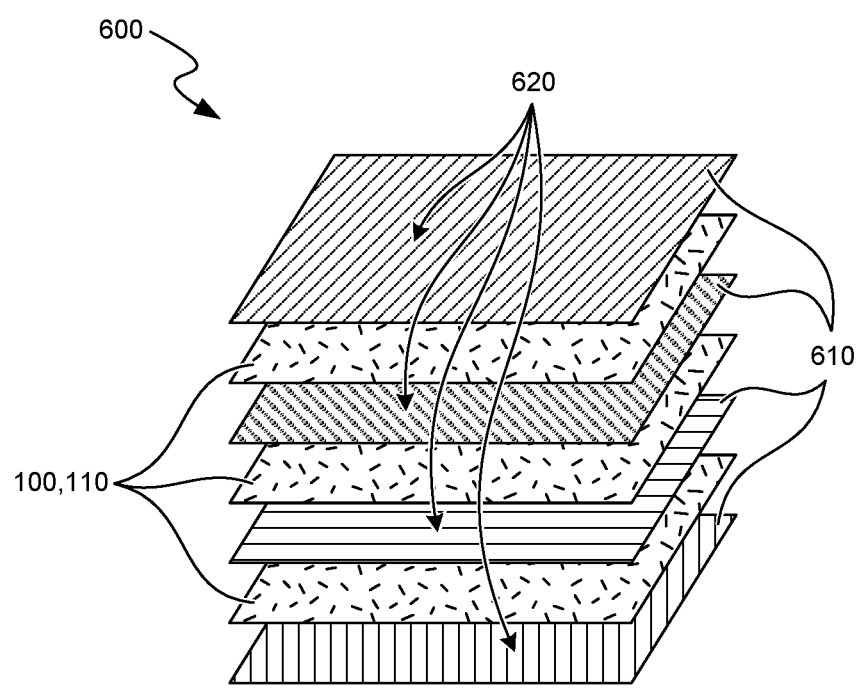
FIG. 6 illustrates a composite laminate stack with a plurality of composite laminate plies and a plurality of matrix films carrying nano-additives, according to an embodiment of the present technology.

In some composite laminate structures, interlaminar shear stresses are highest where two adjacent composite laminate plies have different fiber angles, such as when the fibers are oriented far from parallel to each other. For example, FIG. 6 illustrates a composite laminate stack 600 (which may form all or part of a composite structure, such as the wall of a bat barrel) with a plurality of composite laminate plies 610 according to an embodiment of the present technology. Lines 620 illustrated on the composite laminate plies 610 represent orientations of fibers in the composite laminate plies 610. As illustrated in FIG. 6, the fiber angles in one ply 610 may be different from fiber angles in another ply 610 in a given composite laminate stack 600 (by design, or inadvertently). In such areas, composite laminate plies tend to delaminate before composite laminate plies in other areas (such as areas where the fiber orientations align). Accordingly, in some embodiments of the present technology, the matrix film 100 with nano-additives 110 may be positioned between composite laminate plies 610 that have different fiber orientations.

For example, nano-additives 110 (carried by the matrix film 100) may be positioned between plies 610 having a fiber orientation difference greater than 10 degrees. In a particular embodiment, the matrix film 100 with nano-additives 110 may be applied between a +/−80 degree ply of composite laminate material and a +/−10 degree ply of composite laminate material (with the angle being measured from a common line, such as the longitudinal axis of a ball bat). Such an interface tends to have higher interlaminar shear stresses than an interface between a +/−60 degree ply and a +/−45 degree ply. In some embodiments, the matrix film 100 with nano-additives 110 may be positioned between composite laminate plies that have opposite fiber angles (sometimes known as opposite polarities). Large angle differences, such as opposite fiber angles, may generally be in the outer 25 percent or the inner 25 percent of a composite structure, or in other locations.

In some embodiments, the matrix film 100 with nano-additives 110 may be positioned in every interface between fiber mats or pre-preg material. In some embodiments, the matrix film 100 with nano-additives 110 may be positioned anywhere in a composite laminate stack where enhanced interlaminar strength is desired.

Embodiments of the present technology include methods of making composite structures. For example, a method may include positioning one or more plies of composite material on a mold, such as a mandrel, positioning a matrix film (with nano-additives) on a composite ply, positioning one or more plies of composite material on the matrix film, and curing the assembly to form the composite structure. In some embodiments, the method may include stacking a plurality of composite laminate plies and matrix films in an alternating manner. In some embodiments, the matrix film may be applied by pressing the matrix film onto a ply of composite material (with a roller 310, as illustrated in FIG. 3, for example) and removing a release material from the matrix film. In some embodiments, a release material may not be used to apply the matrix film.

According to embodiments of the present technology, the nano-additives 110 provide a structural link between fiber mats or fibers of composite laminate plies where, in the absence of such nano-additives 110, there would otherwise be a resin-rich area more susceptible to interlaminar failure. Accordingly, the nano-additives 110 help bridge the gap between composite laminate plies to reduce the fragility of resin-rich areas in a composite laminate stack, thereby increasing interlaminar strength. In some embodiments, the additional interlaminar strength provided by nano-additives 110 enables a bat designer to use fewer composite laminate plies without compromising overall bat strength, which allows a bat designer to use less material for cost or weight savings.

In general, in various embodiments, the matrix film 100 with nano-additives 110 (which may be referred to as a nano-enhanced matrix material) may be applied wherever delamination or other damage would otherwise occur first in a testing process, during abuse, or during normal use. For example, when positioned in a region of the bat that experiences the highest amount of impact or other stresses, the matrix film 100 with nano-additives 110 will resist delamination and therefore resist increased performance and will increase resistance to fatigue. In some embodiments, nano-additives 110 may be positioned only in selected areas (to the exclusion of other areas), such as the areas of highest performance, or other areas nano-additives have been described as being implemented in this disclosure. Such limited or selective use reduces the amount of nano-additives needed to take advantage of their properties relative to existing nano-additive systems.

From the foregoing, it will be appreciated that specific embodiments of the disclosed technology have been described for purposes of illustration, but that various modifications may be made without deviating from the technology, and elements of certain embodiments may be interchanged with those of other embodiments, and that some embodiments may omit some elements. For example, although single-wall bats are illustrated and described herein, embodiments of the present technology may include nano-additives in multi-wall bats. And although the matrix film 100 is described herein, other materials may function as vehicles to carry the nano-additives 110 for inclusion in a stack of composite laminate materials.

Further, while advantages associated with certain embodiments of the disclosed technology have been described in the context of those embodiments, other embodiments may also exhibit such advantages, and not all embodiments need necessarily exhibit such advantages to fall within the scope of the technology. Accordingly, the disclosure and associated technology may encompass other embodiments not expressly shown or described herein, and the invention is not limited except as by the appended claims.

What is claimed is:

1. A ball bat comprising:
a handle;
a barrel attached to or continuous with the handle, the barrel comprising a plurality of composite laminate plies forming a wall of the barrel; and
one or more nano-additive materials positioned in a resin-rich area between at least two of the composite laminate plies, wherein some of the nano-additive materials are oriented transversely to the at least two of the composite laminate plies.

2. The ball bat of claim 1 wherein the at least two composite laminate plies comprise a first composite laminate ply and a second composite laminate ply, the first composite laminate ply comprises first fibers oriented along a first direction, and the second composite laminate ply comprises second fibers oriented along a second direction, wherein the first direction is oriented at an angle of at least 10 degrees relative to the second direction.

3. The ball bat of claim 1 wherein the nano-additive materials are positioned at a center of percussion of the ball bat.

4. The ball bat of claim 1 wherein the nano-additive materials comprise carbon nanotubes.

5. The ball bat of claim 1 wherein the nano-additive materials are carried by a matrix film.

6. The ball bat of claim 5 wherein the matrix film is positioned between two of the composite laminate plies within a radially inner one-fourth portion of the thickness of the wall of the barrel closest to an interior of the ball bat.

7. The ball bat of claim 5 wherein the matrix film is positioned between two of the composite laminate plies within a radially outer one-fourth portion of the thickness of the wall of the barrel closest to an exterior surface of the ball bat.

8. The ball bat of claim 1 wherein the nano-additive materials comprise silica nanoparticles, graphenes, or mica nanoparticles.

9. The ball bat of claim 1 wherein the nano-additive materials oriented transversely to the composite laminate plies are oriented perpendicularly relative to the composite laminate plies.

10. The ball bat of claim 1 wherein the nano-additive materials connect the at least two of the composite laminate plies to each other.

11. A ball bat comprising:
a plurality of composite laminate plies; and
a matrix film carrying one or more nano-additive materials, the matrix film being positioned between at least two composite laminate plies of the plurality of composite laminate plies;
wherein some of the one or more nano-additive materials are oriented transversely to the at least two composite laminate plies.

12. The ball bat of claim 11 wherein the at least two composite laminate plies comprise a first composite laminate ply and a second composite laminate ply, the first composite laminate ply comprises first fibers oriented along a first direction, and the second composite laminate ply comprises second fibers oriented along a second direction, wherein the first direction is oriented at an angle of at least 10 degrees relative to the second direction.

13. The ball bat of claim 11 wherein the one or more nano-additive materials comprise carbon nanotubes, silica nanoparticles, graphenes, or mica nanoparticles.

14. The ball bat of claim 11 wherein the nano-additive materials oriented transversely to the composite laminate plies are oriented perpendicularly relative to the composite laminate plies.

15. The ball bat of claim 11 wherein the nano-additive materials connect the at least two composite laminate plies to each other.

16. A ball bat comprising:
a handle;
a barrel attached to or continuous with the handle, the barrel comprising a plurality of composite laminate plies forming a wall of the barrel; and
one or more nano-additive materials positioned in a resin-rich area between at least two of the composite laminate plies, wherein some of the nano-additive materials are oriented transversely to the at least two composite laminate plies and connect the at least two composite laminate plies to each other.

17. The ball bat of claim 16 wherein the nano-additive materials are carried by a matrix film.

18. The ball bat of claim 17 wherein the composite laminate plies comprise pre-preg composite laminate plies.

19. The ball bat of claim 16 wherein the one or more nano-additive materials comprise carbon nanotubes, silica nanoparticles, graphenes, or mica nanoparticles.

* * * * *